(12) United States Patent
Yasutomi et al.

(10) Patent No.: US 9,542,575 B2
(45) Date of Patent: Jan. 10, 2017

(54) TRANSACTION TERMINAL DEVICE

(71) Applicant: PANASONIC INTELLECTUAL PROPERTY MANAGEMENT CO., LTD., Osaka (JP)

(72) Inventors: Kenya Yasutomi, Osaka (JP); Tsutomu Kojitani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/707,544

(22) Filed: May 8, 2015

(65) Prior Publication Data

US 2016/0034725 A1 Feb. 4, 2016

(30) Foreign Application Priority Data

Jul. 31, 2014 (JP) .................................. 2014-155797

(51) Int. Cl.
*G06K 5/00* (2006.01)
*G06K 15/00* (2006.01)
(Continued)

(52) U.S. Cl.
CPC .............. *G06K 7/084* (2013.01); *H01Q 1/243* (2013.01)

(58) Field of Classification Search
USPC .......................... 235/380, 383, 449, 493, 475
See application file for complete search history.

(56) References Cited

U.S. PATENT DOCUMENTS 4,297,735 A * 10/1981 Eppich .................. G06K 7/084
                                                    360/130.3
5,786,587 A *  7/1998 Colgate, Jr. ............ G06K 19/14
                                                    235/454
(Continued)

FOREIGN PATENT DOCUMENTS

JP        2001-250165        9/2001
JP        2013-257878        12/2013
(Continued)

OTHER PUBLICATIONS

U.S. Appl. No. 14/706,124 to Kazuki Saitoh, which was filed on May 7, 2015.

*Primary Examiner* — Tuyen K Vo
(74) *Attorney, Agent, or Firm* — Greenblum & Bernstein, P.L.C.

(57) ABSTRACT

In a transaction terminal device, a magnetic head module that supports a magnetic head which reads a magnetic card, and a plurality of communication antennas used for communications according to different standards are arranged at the same end within a housing. The magnetic head module includes a line-shaped metal urging member that exerts urging force to a magnetic head in a passing path direction of the magnetic card. Even though a communication antenna is arranged close to the magnetic head, a reradiated radio wave generated from the metal urging member of the magnetic head receiving a radio wave radiated from an adjacent communication antenna is reduced, and communication quality is secured. Accordingly, even though the communication antenna is arranged close to the magnetic head that reads the magnetic card, the transaction terminal device can normally complete the transaction using the read magnetic card.

20 Claims, 6 Drawing Sheets

(51) Int. Cl.
*G06K 7/08* (2006.01)
*H01Q 1/24* (2006.01)

(56) References Cited

U.S. PATENT DOCUMENTS

| | | | |
|---|---|---|---|
| 5,923,019 A * | 7/1999 | Bedell, Jr. | G06K 7/084 |
| | | | 235/449 |
| 2002/0093749 A1* | 7/2002 | Nakabo | G11B 5/49 |
| | | | 360/2 |
| 2004/0012875 A1* | 1/2004 | Wood | G06K 7/084 |
| | | | 360/55 |
| 2006/0022046 A1* | 2/2006 | Iwamura | G06K 7/0008 |
| | | | 235/451 |
| 2009/0146796 A1* | 6/2009 | Goto | H04B 5/02 |
| | | | 340/10.51 |
| 2010/0040162 A1* | 2/2010 | Suehiro | H04L 25/0204 |
| | | | 375/260 |
| 2010/0127071 A1* | 5/2010 | Fang | G06K 7/087 |
| | | | 235/380 |
| 2011/0062235 A1* | 3/2011 | Morley, Jr. | G06K 7/083 |
| | | | 235/449 |
| 2011/0095084 A1* | 4/2011 | Tian | G06F 21/31 |
| | | | 235/379 |
| 2011/0278359 A1* | 11/2011 | Kasai | G06K 7/084 |
| | | | 235/449 |
| 2011/0290874 A1* | 12/2011 | Tang | G06Q 20/32 |
| | | | 235/379 |
| 2013/0332228 A1 | 12/2013 | Lim et al. | |
| 2013/0332354 A1 | 12/2013 | Rhee et al. | |
| 2014/0099991 A1* | 4/2014 | Cheng | G06F 3/017 |
| | | | 455/550.1 |
| 2014/0101737 A1 | 4/2014 | Rhee | |
| 2014/0162598 A1* | 6/2014 | Villa-Real | H04M 1/66 |
| | | | 455/411 |

FOREIGN PATENT DOCUMENTS

| | | |
|---|---|---|
| JP | 2015-014943 | 1/2015 |
| WO | 2015/015661 | 2/2015 |

* cited by examiner

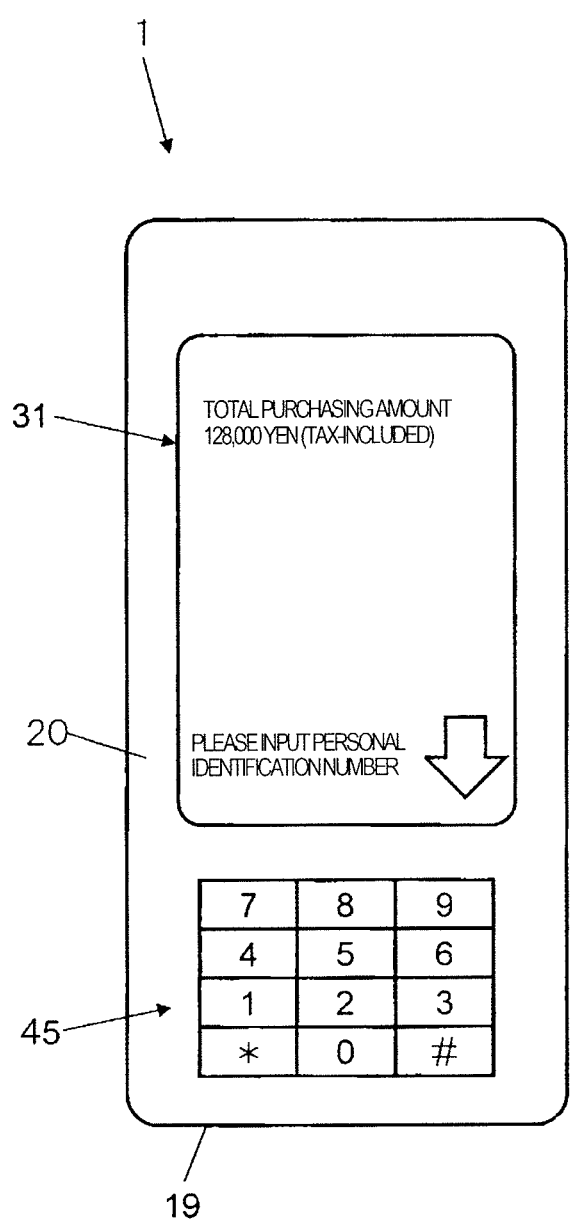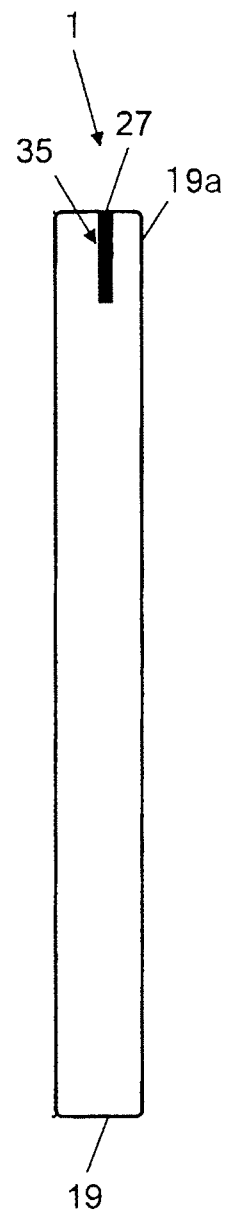
FIG. 1A
FIG. 1B

TRANSACTION TERMINAL DEVICE

BACKGROUND OF THE INVENTION

1. Field of the Invention

The present invention relates to a transaction terminal device, and more particularly, to a portable transaction terminal device.

2. Description of the Related Art

In recent years, a mobile terminal device having high functionality such as a smart phone or a tablet terminal has been widely used. Services supported by such a mobile terminal device have been diversified. As one of the services, there is a transaction service. For example, Japanese Patent Unexamined Publication No. 2013-257878 discloses a technology that can provide a shopping service without requiring a credit card of a user by operating a mobile terminal device carried by the user to receive a service.

A transaction service in which an operator who provides a service performs using a credit card of a customer is still widely used, and a transaction terminal device (transaction terminal device) used by the operator who provides a service is still needed. Particularly, a service provider who conducts an inventory management task or a service provider who supports business activities outside a store such as insurance sales uses a portable transaction terminal device. The portable transaction terminal device has a communication function as in a smart phone or a tablet terminal, and a transaction terminal device having good operability and visibility is needed.

For example, the portable transaction terminal device used by the operator who provides the service needs to have a corresponding communication standard and a plurality of communication functions using different communication channels such that the transaction terminal device uses a mobile telephone network outside a building and uses wireless LAN inside the building.

In addition to such communication functions, a function of reading a credit card is offered to the portable transaction terminal device used by the operator who provides the service. As the credit card, there are a contact IC card, a non-contact IC card and a magnetic card which is still used the most. Accordingly, the portable transaction terminal device used by the operator who provides the service needs to have at least a function of reading the magnetic card. In addition, in order to cause the portable transaction terminal device used by the operator who provides the service to read the contact IC card or the non-contact IC card, it is necessary to provide a secure input unit used to input a personal identification number (PIN) of the card.

As stated above, the portable transaction terminal device used by the operator who provides the service needs to have more functions while suppressing expansion of a housing volume at minimum, as compared to a mobile terminal device for consumers carried by a user who receives a service. Particularly, there are limitations on expansion in a width direction of the portable transaction terminal device. This is because the operator needs to hold the transaction terminal device with one hand. However, such expansion is suppressed at minimum, and when a plurality of communication functions according to different communication standards and a reading function of the magnetic card are offered to the portable transaction terminal device, it is difficult to secure communication quality of at least one of the plurality of communication functions. More specifically, it is difficult to secure communication quality of a communication antenna arranged close to a magnetic head that reads the magnetic card. As a result, the transaction terminal device does not normally complete the transaction using the read magnetic card.

SUMMARY OF THE INVENTION

A transaction terminal device of the present disclosure can includes a configuration capable of securing security, being easily carried by a service provider or being easily operated by a service recipient.

A transaction terminal device of the present disclosure includes a housing that includes a first surface having an operation display surface, a second surface opposite to the operation display surface, and a stepped part formed at one end of the second surface in substantially parallel with an end side of the one end. The length of the one end adjacent to the stepped part in a thickness direction of the housing is greater than the length of the other end adjacent to the stepped part in the thickness direction of the housing. A non-secure region that does not have tamper resistance is formed at the one end of the housing, and a secure region having tamper resistance is formed on the other end of the housing.

According to the present disclosure, it is possible to provide a transaction terminal device capable of securing security, being easily carried by a service provider or being easily operated by a service recipient.

BRIEF DESCRIPTION OF DRAWINGS

FIG. 1A is a plan view showing a configuration example of a transaction terminal device according to a first embodiment;

FIG. 1B is a side view of the transaction terminal device shown in FIG. 1A.

DETAILED DESCRIPTION OF THE PREFERRED EMBODIMENT

Figure 2:
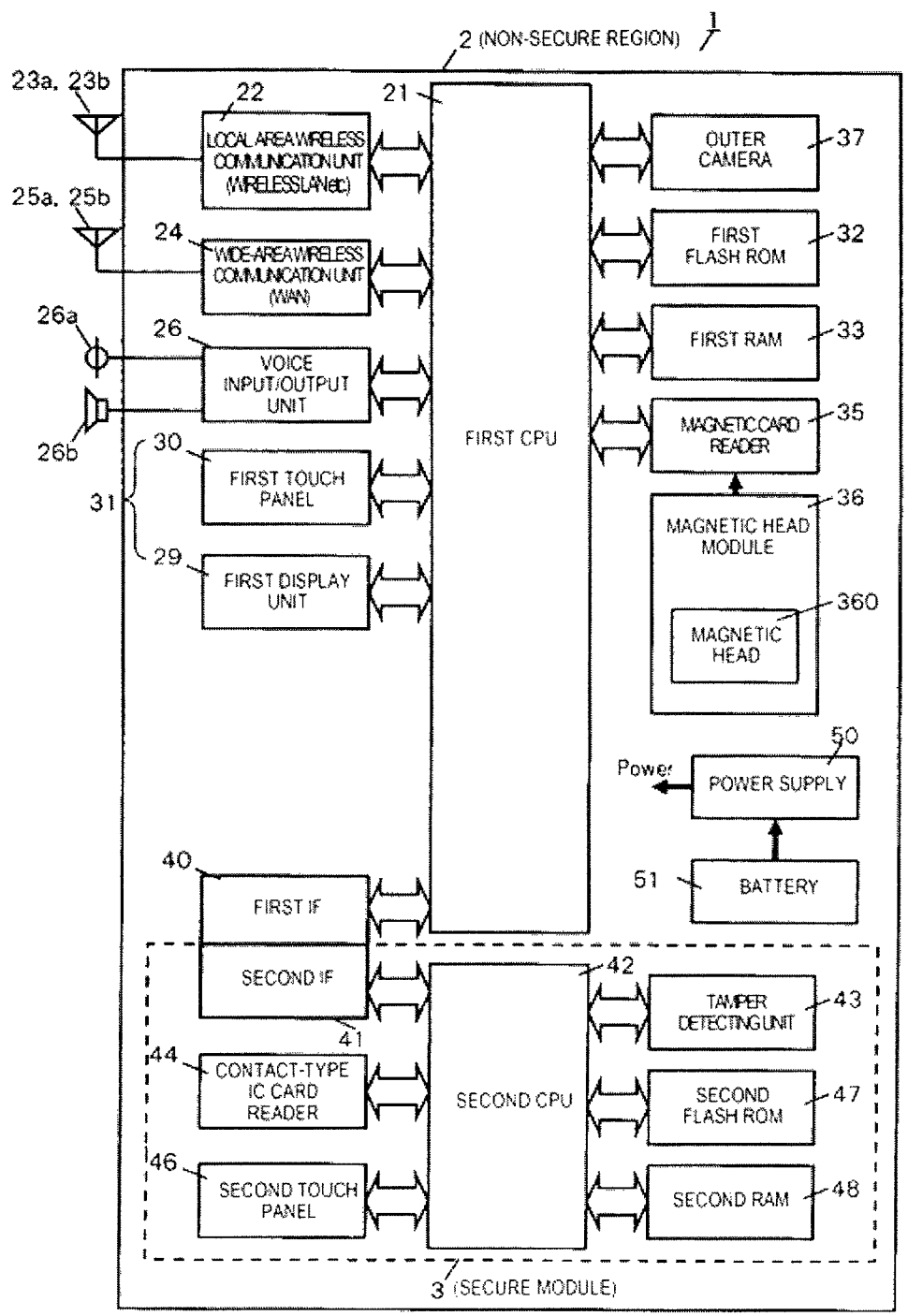
FIG. 2 is a block diagram showing a hardware configuration example of the transaction terminal device according to Exemplary Embodiment 1.

Hereinafter, an exemplary embodiment of the present disclosure will be described with reference to the drawings. It will be described that a transaction terminal device according to the present disclosure is, for example, a portable transaction terminal device used in a transaction process in transactions of goods or services.

(Exemplary Embodiment 1)

FIG. 1A is a front view of transaction terminal device 1 of Exemplary Embodiment 1. FIG. 1B is a side view of transaction terminal device 1 shown in FIG. 1A.

Transaction terminal device 1 of Exemplary Embodiment 1 is a portable type, and includes first touch-panel-equipped LCD 31 (first input/display unit), and second touch panel 45 (second input unit) which are provided on operation surface 20 of housing 19. First touch-panel-equipped LCD 31 displays, for example, amount-of-money information as a non-secure content, and receives an amount of money as an input. Second touch panel 45 receives, for example, a PIN which is a secure content, as an input.

Second touch panel 45 is disposed on operation surface 20 forward of first touch-panel-equipped LCD 31. The "front side" in Exemplary Embodiment 1 refers to a lower side of housing 19 erected in a direction in which operation surface 20 is parallel to a vertical line, and a side close to an operator when housing 19 is held such that operation surface 20 is parallel to a surface substantially perpendicular to the vertical line. Accordingly, when housing 19 is erected such that first touch-panel-equipped LCD 31 and second touch panel 45 provided on operation surface 20 are arranged in a direction parallel to the vertical line, second touch panel 45 is disposed on a lower side of housing 19 than first touch-panel-equipped LCD 31. Alternatively, first touch-panel-equipped LCD 31 and second touch panel 45 are arranged on operation surface 20 which is one surface of housing 19 of transaction terminal device 1 by being biased at oppositely positioned ends with the center of gravity of housing 19 of transaction terminal device 1 interposed therebetween.

Transaction terminal device 1 is a portable type, and includes non-secure region 2, and secure module 3 which is a secure region. The "secure" means that the region has tamper resistance. The "tamper" refers to illegal analysis and modification of software or hardware within an information processing device (for example, transaction terminal device 1), illegal piracy and modification, of information within the information processing device (for example, transaction terminal device 1), and attack to allow the information to be disabled. Accordingly, the "tamper resistance" refers to resistance to such attack. For example, by having the tamper resistance, information of a customer is protected in the transaction process, and thus, it is possible to safely perform transaction. The "non-secure" means that the region has no tamper resistance or the region has low tamper resistance. Non-secure region 2 may be implemented as a "secure" region, but it is assumed that non-secure region 2 is included in transaction terminal device 1 according to Exemplary Embodiment 1.

In transaction terminal device 1, magnetic card reader 35 and outer camera 37 are arranged on a side (non-secure side) opposite to second input unit with first input/display unit interposed therebetween. Magnetic head module 36 that supports magnetic head 360 disposed in slit 27 (passing path of the magnetic card) formed in upper end 19a of non-secure region 2 is connected to magnetic card reader 35. Slit 27 constitutes a part of magnetic head module 36 to be described below, and is a path for reading information (magnetic stripe) of the magnetic card when the magnetic card is slid (swiped). Outer camera 37 is used to read a barcode in addition to normal photographing.

Next, a hardware configuration example of transaction terminal device 1 will be described.

FIG. 2 is a block diagram showing a hardware configuration example of transaction terminal device 1 according to Exemplary Embodiment 1.

Transaction terminal device 1 includes non-secure region 2 and secure module 3. Non-secure region 2 indicates a region that excludes secure module 3 from inside a rectangular frame shown in FIG. 2. First central processing unit (CPU) 21, local area wireless communication unit 22, wide-area wireless communication unit 24, voice input/output unit 26, first display unit 29 (LCD), and first touch panel 30 (first touch input detecting unit) are provided in non-secure region 2. First display unit 29 and first touch panel 30 constitute first touch-panel-equipped LCD 31 (first input/display unit).

First flash read-only memory (ROM) 32, first random-access memory (RAM) 33, magnetic card reader 35, first interface (IF) 40, power supply 50, and battery 51 are provided in non-secure region 2.

In non-secure region 2, various components are connected to first CPU 21. First CPU 21 generalizes all of the components of non-secure region 2. For example, first CPU 21 performs controlling, processing, setting and determining operations in various manners by executing programs stored in first flash ROM 32. An execution environment of first CPU 21 of non-secure region 2 is less limited than an execution environment of second CPU 42 of the secure region. Thus, it is possible to execute various application programs, and it is possible to easily facilitate high functionality or wide-range applications of transaction terminal device 1.

Local area wireless communication unit 22 is connected to local area wireless communication antennas 23a and 23b, and has a function of performing, for example, wireless LAN communication by using a non-illustrated local area wireless communication path. Local area wireless communication unit 22 may perform communication (for example, Bluetooth (registered trademark) communication) other than wireless LAN communication. Local area wireless communication unit 22 of transaction terminal device 1 according to Exemplary Embodiment 1 has a function of performing wireless LAN communication.

Wide-area wireless communication unit 24 is connected to wide-area wireless communication antennas 25a and 25b, and has a function of performing communication through a non-illustrated wide-area wireless communication path (for example, wide area network (WAN)). Communication in wide-area wireless communication path may be performed using, for example, a wireless telephone network (mobile telephone network such as wideband code division multiple access (W-CDMA), code division multiple access (CDMA), long term evolution (LTE), or universal mobile telecommunications system (UMTS)). Communication by wide-area wireless communication unit 24 of transaction terminal device 1 according to Exemplary Embodiment 1 is performed using W-CDMA that uses a frequency bandwidth lower than that of local area wireless communication by local area wireless communication unit 22.

Voice input/output unit 26 is connected to microphone 26a and speaker 26b, and has a function of controlling an input or an output of voice. For example, voice input/output unit 26, microphone 26a, speaker 26b, and wide-area wireless communication unit 24 can make a telephone call with another mobile phone or landline telephone. For example, when a user (clerk or customer) operates transaction terminal device 1, speaker 26b is used to produce a sound for giving a warning notice to the user or a warning sound indicating an operation error.

First display unit 29 (LCD) has a function of controlling a display of first touch-panel-equipped LCD 31 (first input/display unit). First touch panel 30 (first touch input detecting unit) has a function of detecting a touch input on first touch-panel-equipped LCD 31.

First flash ROM 32 has a function of storing various data. The stored data may be data about these tasks or task application programs, or may be programs for controlling transaction terminal device 1 (for example, non-secure region 2).

For example, when arithmetic processing according to operations of transaction terminal device 1 (for example, the components of non-secure region 2) is performed, first RAM 33 is a memory used for temporarily storing process data generated during the arithmetic processing.

Magnetic card reader 35 is disposed within slit 27 of FIG. 1B, and has a function of reading the magnetic stripe of the magnetic card.

Power supply 50 receives power from battery 51 or the outside, and supplies power to non-secure region 2 and secure module 3. Alternatively, power supply 50 receives power from the outside, and can charge battery 51. First CPU 21 can supply power and stop supplying of power with respect to a part or all of circuits arranged in non-secure region 2 by controlling power supply 50.

Non-secure region 2 and secure module 3 are connected to each other through first IF 40 and second IF 41, and various data or commands are delivered therebetween.

Secure module 3 includes second CPU 42, tamper detecting unit 43, contact-type IC card reader 44, second touch panel 45 (second touch input detecting unit), second flash ROM 47, and second RAM 48.

In secure module 3, various components are connected to second CPU 42. Second CPU 42 generalizes all of the components of secure module 3. Second CPU 42 performs controlling and processing (for example, reading of an IC card and input reception/inquiry of a PIN) in various manners by executing programs stored in, for example, second flash ROM 47.

Tamper detecting unit 43 monitors secure module 3, and detects, for example, disassembly, destruction or unsealing of secure module 3. That is, tamper detecting unit 43 detects whether or not abnormality occurs in secure module 3. When such an event is detected by tamper detecting unit 43, the transaction process may be stopped, or may inform that abnormality occurs in secure module 3 using first display unit 29 (LCD).

Contact-type IC card reader 44 includes an embedded electrode (not shown), and when a contact-type IC card is inserted into a card insertion unit (not shown), this electrode is electrically connected to an electrode provided on the surface of the contact-type IC card.

Second touch input detecting unit, that is, second touch panel 45 is configured to detect the input of the PIN. Transaction terminal device 1 may use a physical key or a soft key for inputting the PIN instead of second touch panel 45.

Second flash ROM 47 has a function of storing various data. The stored data is a program for controlling transaction terminal device 1 (for example, components of secure module 3) or a program for inquiring the PIN input by second touch panel 45 during the transaction.

For example, when arithmetic processing according to the operations of transaction terminal device 1 (for example, secure module 3) is performed, second RAM 48 is a memory used to temporarily store process data generated during the arithmetic processing.

As mentioned above, transaction terminal device 1 includes non-secure region 2, and secure module 3. Card authentication information used for the transaction is input to second touch panel 45 of secure module 3. Accordingly, the card authentication information used for the transaction can be input to transaction terminal device 1 while securing safety, and the "tamper resistance" can also be secured. A "secure" portion requiring the "tamper resistance" is localized in secure module 3, and is miniaturized (for example, see FIG. 1B).

Meanwhile, many information terminals (for example, smart phones or tablet terminals) distributed as devices for consumers or some terminals thereof may be used in non-secure region 2, as a platform.

By using a general-purpose platform in non-secure region 2, development resources of application software (transaction application) for the transaction and application software (task application) used for other tasks are easily reused or applied. The transaction application and another task application are flexibly operated without stress by being processed by first CPU 21 of non-secure region 2 having, for example, high arithmetic processing ability. Various task applications or transaction processes in which transaction schemes are diversified can be easily used.

Figure 3:
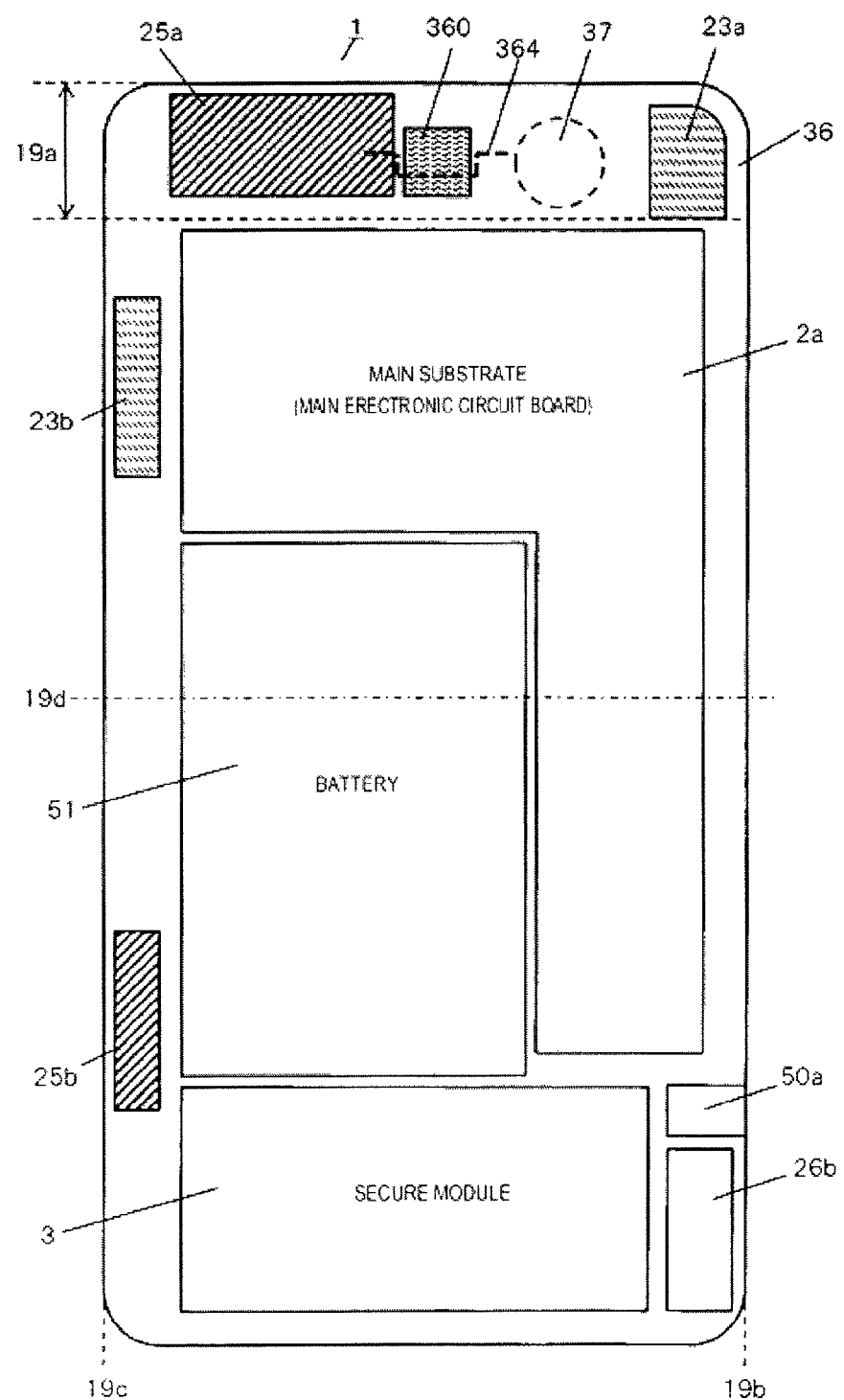
FIG. 3 is a rear perspective view showing a positional relationship between wireless communication antennas and a magnetic head module in a housing of the transaction terminal device according to Exemplary Embodiment 1.

FIG. 3 is a rear perspective view showing a positional relationship between respective wireless communication antennas 23a, 23b, 25a and 25b and magnetic head 360 of magnetic head module 36 within housing 19 of transaction terminal device 1 according to Exemplary Embodiment 1.

In FIG. 3, magnetic head 360 and magnetic head module 36 (see FIG. 2, FIG. 4 and FIG. 5) that supports the magnetic head, and a plurality of wireless communication antennas 23a and 25a are arranged at the same end (upper end 19a) within housing 19. Magnetic head 360 and magnetic head module 36 are configured to read the magnetic card (see FIG. 4, not shown in FIG. 3) used for the transaction of a customer to receive a service. Local area wireless communication antenna 23a is connected to local area wireless communication unit 22 that performs, for example, wireless LAN communication. Wide-area wireless communication antenna 25a is connected to wide-area wireless communication unit 24 that performs W-CDMA communication which uses a frequency bandwidth lower than that of local area wireless communication by local area wireless communication unit 22.

An operator holds a portion near a central part 19d of the transaction terminal device such that second touch panel 45 as a secure input unit is positioned on a side close to the operator. Magnetic head module 36 and wireless communication antennas 23a and 25a are arranged within housing 19 on a side opposite to secure module 3 including second touch panel 45 with first touch-panel-equipped LCD 31 and central part 19d of housing 19 interposed therebetween. As a result, magnetic head 360, local area wireless communication antenna 23a and wide-area wireless communication antenna 25a are arranged on a side separated from the operator. Accordingly, reading operability and communication quality of the magnetic card are secured.

A core surface as a contact surface of magnetic head 360 with the magnetic card faces slit 27. Magnetic head 360 is preferably disposed near a central portion of upper end 19a in anticipation that the magnetic card will be most stably read in a width direction when housing 19 is erected in the direction in which operation surface 20 is parallel to the vertical line. Accordingly, local area wireless communication antenna 23a and wide-area wireless communication antenna 25a are arranged on opposite sides to each other with magnetic head 360 interposed therebetween in the width direction when housing 19 is erected such that first touch-panel-equipped LCD 31 and second touch panel 45 are parallel to the vertical line.

Local area wireless communication antenna 23b and local area wireless communication antenna 23a are connected to local area wireless communication unit 22. Local area wireless communication antenna 23b is disposed at side end 19c opposite to side end 19b at which wireless communication antenna 23a is arranged in the width direction when housing 19 is erected such that first touch-panel-equipped LCD 31 and second touch panel 45 are parallel to the vertical line. With the aforementioned antenna arrangement, a space diversity effect is obtained in local area wireless communication by local area wireless communication unit 22.

Wide-area wireless communication antenna 25b that uses a frequency bandwidth lower than that of local area wireless communication by local area wireless communication unit 22 and wide-area wireless communication antenna 25a are connected to wide-area wireless communication unit 24. Wide-area wireless communication antenna 25b is arranged at a position separated in a vertical line direction when housing 19 is erected such that first touch-panel-equipped LCD 31 and second touch panel 45 are parallel to the vertical line. With the above-described antenna arrangement, a space diversity effect is also obtained in wide-area wireless communication by wide-area wireless communication unit 24. More specifically, wide-area wireless communication antenna 25b which is the other antenna element of a diversity antenna for wide-area wireless communication is arranged within housing 19 on a side opposite to magnetic head 360 with first touch-panel-equipped LCD 31 and central part 19d of housing 19 interposed therebetween. In order to avoid deterioration in reception sensitivity or suppression in transmission output for protecting the human body, since wide-area wireless communication antenna 25b is arranged except for central part 19d where the hand of the operator of transaction terminal device 1 is positioned and a surrounding region thereof, communication quality is further secured.

Local area wireless communication antenna 23b is arranged at side end 19c opposite to side end 19b where local area wireless communication antenna 23a is arranged with magnetic head 360 interposed therebetween, and is arranged closer to upper end 19a than central part 19d of housing 19. Wide-area wireless communication antenna 25b is arranged at the same side end 19c as wide-area wireless communication antenna 25a, but is arranged on a side opposite to upper end 19a where wide-area wireless communication antenna 25a is arranged with central part 19d of housing 19 interposed therebtween. Wide-area wireless communication antennas 25a and 25b are used for wide-area wireless communication that uses a frequency bandwidth lower that of local area wireless communication. In order to obtain an effective space diversity effect, wide-area wireless communication antennas 25a and 25b need to be arranged with a greater distance than local area wireless communication antennas 23a and 23b. The length of transaction terminal device 1 in a longitudinal direction of housing 19 is greater than that in a width direction. The "longitudinal direction" mentioned herein refers to a direction in which first touch-panel-equipped LCD 31 and second touch panel 45 are arranged, and the "width direction" refers to a direction perpendicular to the direction in which first touch-panel-equipped LCD 31 and second touch panel 45 are arranged. Since local area wireless communication antennas 23a and 23b are arranged so as to be separated in the width direction and wide-area wireless communication antennas 25a and 25b are arranged so as to be separated in the longitudinal direction, an effective space diversity effect is obtained in any of local area wireless communication and wide-area wireless communication.

In addition, wide-area wireless communication antenna 25b is arranged on a side which is opposite to magnetic head 360 and is closer to central part 19d than secure module 3 including second touch panel 45 with first touch-panel-equipped LCD 31 and central part 19d of housing 19 interposed therebetween. That is, wide-area wireless communication antenna 25b is arranged at a position which is separated from the operator and is separated from magnetic head 360 arranged on an opposite side with central part 19d of the housing interposed therebetween and wide-area wireless communication antenna 25a which is close to the magnetic head. Accordingly, in wide-area wireless communication, the operator is hardly influenced by radio wave absorption, a space diversity effect is effectively obtained, and communication quality is further secured.

As described above, wireless communication antennas 25a and 25b for wide-area wireless communication are used for communication that uses a frequency bandwidth lower than that of wireless communication antennas 23a and 23b for local area wireless communication. The area and length of wireless communication antenna 25a are greater than those of wireless communication antenna 23a, and in FIG. 3, the distance between magnetic head 360 of wireless communication antenna 25a for wide-area wireless communication and magnetic head 360 is not nearly secured. Problems caused by the distance and the configuration for solving these problems will be described below.

Figure 4A:
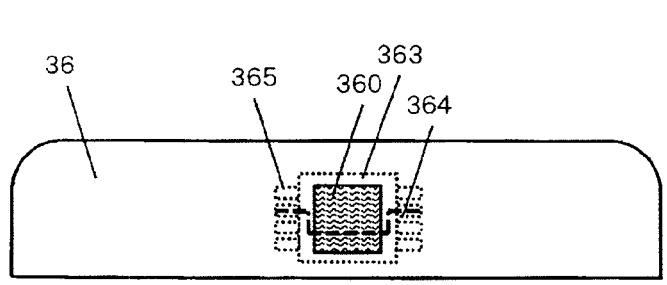
FIG. 4A is a front view of the magnetic head module included in the transaction terminal device according to Exemplary Embodiment 1.
Figure 4B:
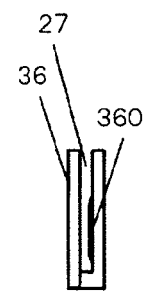
FIG. 4B is a side view of the magnetic head module included in the transaction terminal device according to Exemplary Embodiment 1.
Figure 4C:
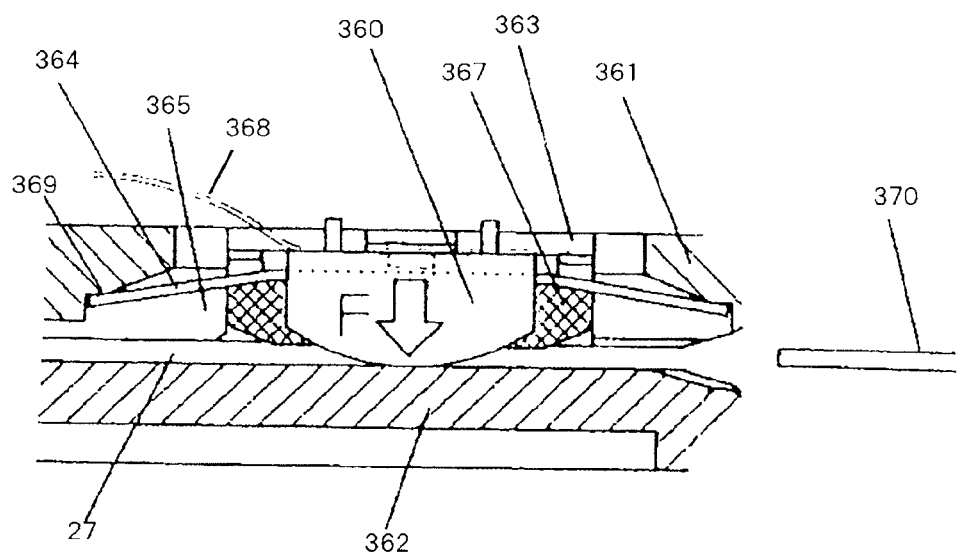
FIG. 4C is a cross-sectional view showing a magnetic head of the magnetic head module included in the transaction terminal device according to Exemplary Embodiment 1 and a surrounding region thereof
Figure 5:
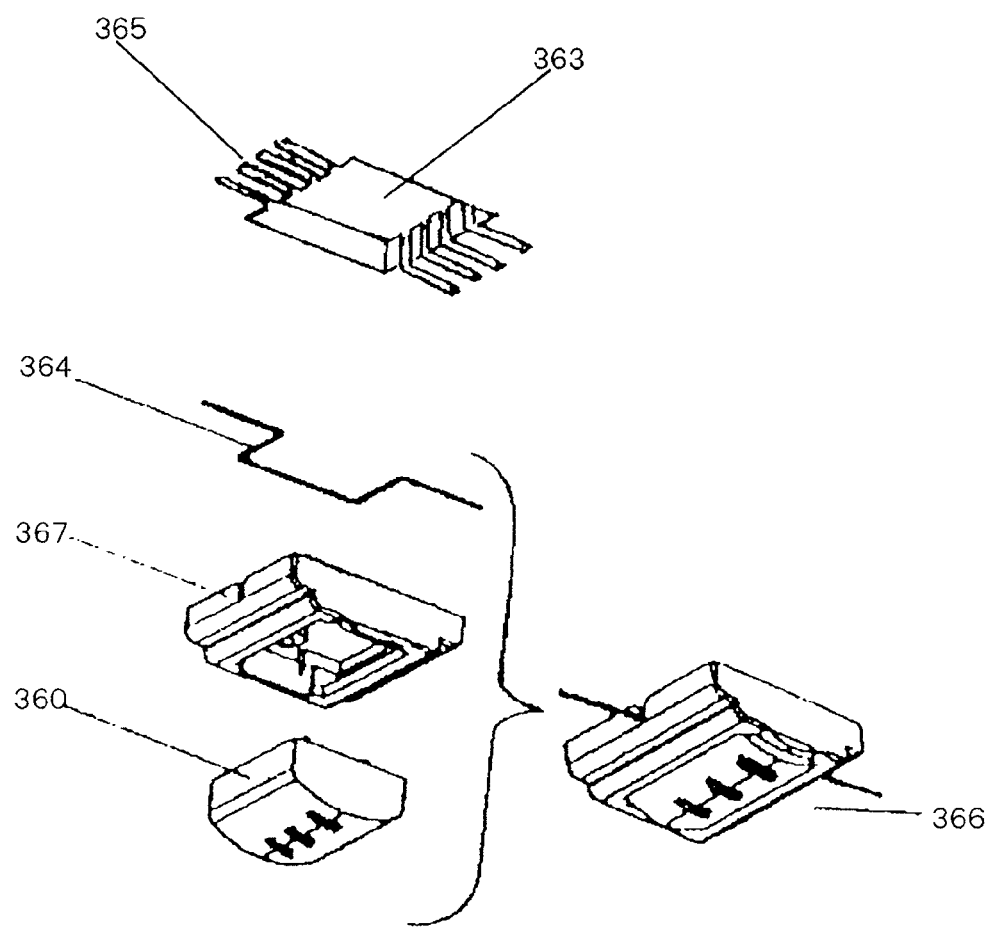
FIG. 5 is an exploded perspective view of the magnetic head module included in the transaction terminal device according to Exemplary Embodiment 1.

FIG. 4A is a front view of magnetic head module 36 included in transaction terminal device 1 according to Exemplary Embodiment 1. FIG. 4B is a side view of magnetic head module 36 included in transaction terminal device 1 according to Exemplary Embodiment 1. FIG. 4C is a cross-sectional view of magnetic head 360 of magnetic head module 36 included in transaction terminal device 1 according to Exemplary Embodiment 1 and a surrounding region thereof. FIG. 5 is an exploded perspective view of magnetic head module 36 included in transaction terminal device 1 according to Exemplary Embodiment 1.

Magnetic head 360 that reads a magnetic signal recorded in magnetic card 370 is interposed between upper case 361 and lower case 362 of magnetic head module 36. The core surface (reading surface) of magnetic head 360 is provided close to slit 27 (card guiding path) through which a magnetic stripe of magnetic card 370 passes. Attachment hole 363 of magnetic head 360 and spring contact recessed line 365 that comes in contact with an end of metal wire spring 364 (urging member) for exerting force (urging force) which presses magnetic head 360 against slit 27 are formed in upper case 361 of magnetic head module 36. Magnetic head supporting mechanism 366 in FIG. 5 attaches magnetic head 360 and wire spring 364 having a substantially U shape to magnetic head supporting member 367.

As shown in FIGS. 4 and 5, after magnetic head supporting mechanism 366 is inserted into attachment hole 363 of upper case 361 such that the end of metal wire spring 364 comes in contact with spring contact recessed line 365, lower case 362 is fixed to upper case 361 through a screw. As a result, magnetic head 360 is held while being interposed between upper case 361 and lower case 362, and the core surface of magnetic head 360 comes in contact with lower case 362. Head cable 368 sends a signal read by magnetic head 360 to secure module 3 (see FIG. 2) through first IF 40 and second IF 41.

Next, when magnetic card 370 is inserted into slit 27, wire spring 364 is lifted up in the vertical direction with a portion coming in contact with a bottom of spring contact recessed line 365 as a support point 369, and exerts an urging force F to magnetic head 360.

Magnetic head 360 is operated by coming in close contact with the magnetic stripe of magnetic card 370, and reads information recorded in the magnetic stripe. The data of magnetic card 370 read by magnetic head 360 is sent to secure module 3 (see FIG. 2) via head cable 368.

As stated above, pressing force of magnetic head module 36 against slit 27 (passing path of magnetic card 370) is exerted to magnetic head 360 by wire spring 364 which is a metal urging member. When the credit card passes through slit 27, magnetic head 360 is retracted toward a side opposite to slit 27 in a direction perpendicular to a card surface when magnetic card 370 passes such that excess frictional force is not exerted to the magnetic stripe of magnetic card 370 to contact. However, due to the urging force F to slit 27 by wire spring 364, magnetic head 360 continues to come in contact with the magnetic stripe of magnetic card 370 passing through slit 27. When magnetic card 370 finishes passing through slit 27, magnetic head 360 returns to an initial position due to the urging force F of wire spring 364 to wire spring to slit 27 in the direction perpendicular to the card surface when magnetic card 370 passes. In order to secure durability by exerting the sufficient urging force F to magnetic head 360, wire spring 364 needs to be made of metal.

Figure 6:
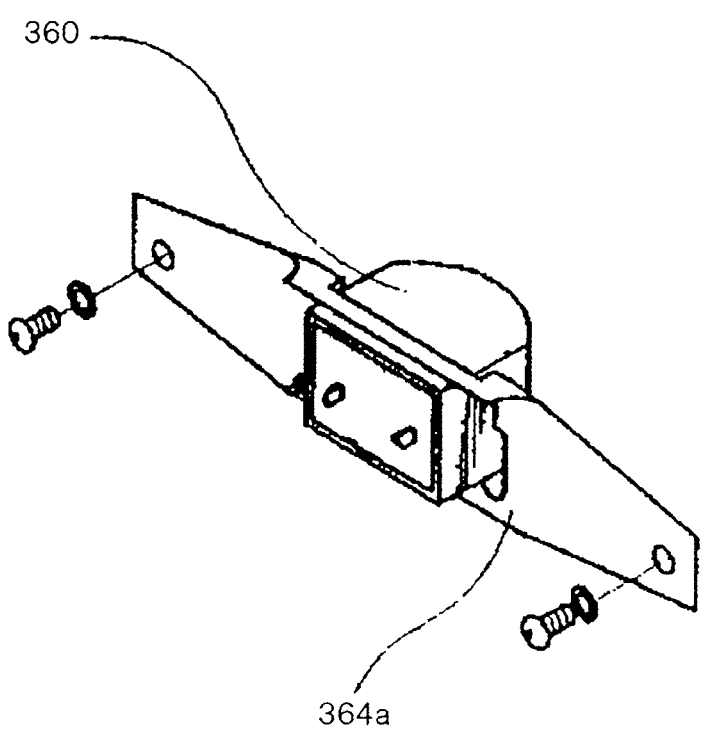
FIG. 6 is a diagram showing the configuration of a magnetic head of the related art and an urging member thereof.

As stated above, magnetic head module 36 mounted on transaction terminal device 1 according to Exemplary Embodiment 1 includes an urging member of a metal wire that exerts urging force to magnetic head 360, that is, wire spring 364 as shown in FIGS. 4 and 5. In contrast, communication quality by wide-area wireless communication antenna 25a (see FIG. 3) close to magnetic head 360 of FIG. 6 is degraded due to influence of a reradiated radio wave generated by urging member 364a of a metal plate shown in FIG. 6 receiving a radio wave radiated from wide-area wireless communication antenna 25a. FIG. 6 is a diagram showing the configuration of a magnetic head of the related art and an urging member thereof.

The wavelength of a radio wave used for communication is determined by a using method needed for transaction terminal device 1 (see FIGS. 1 to 3). Portable transaction terminal device 1 is used in a building or a site where a communication spot of local area wireless communication such as wireless LAN is present round here, but is used outside a building or a site where such a communication spot is not present round here in some cases. For example, the user of transaction terminal device 1 performs the transaction using the magnetic card of a customer of a visiting site in some cases. In this case, the user of transaction terminal device 1 connects a transaction center (processor) and transaction terminal device 1 by wide-area wireless communication, and performs the transaction process. As wide-area wireless communication, for example, W-CDMA, CDMA, LTE or UMTS is selected as mentioned above.

Next, the dimension, material and shape of urging member 364a (or wire spring 364 (see FIGS. 3 and 5)) of magnetic head 360 are designed using dimensions required for transaction terminal device 1 by the user such that necessary and sufficient urging force (pressing force) and durability are obtained for magnetic head 360. When the transaction terminal device is designed for miniaturization such that the user carries transaction terminal device 1 and performs the transaction inside or outside the building or inside or outside the site, an appropriate dimension of urging member 364a (or wire spring 364) approximates a dimension in which a radio wave used in the frequency bandwidth of wide-area wireless communication resonates. In order to increase a space diversity effect of communication, it is necessary to set the distance between two communication antennas constituting diversity needs to at least about ¼ wavelengths or more. In order to satisfy the arrangement condition, at least one antenna is arranged close to magnetic head 360 of the magnetic card reader (the details will be described below).

As a result, due to a reradiated radio wave generated from urging member 364a receiving a radio wave radiated from wide-area wireless communication antenna 25a, transmission characteristics of wide-area wireless communication antenna 25a close to urging member 364a are degraded. Similarly, reception characteristics of wide-area wireless communication antenna 25a are also degraded. That is, communication quality of wide-area wireless communication antenna 25a is not obtained, and thus, transaction terminal device 1 does not normally complete the transaction by the read magnetic card on some cases.

The reason why at least one antenna is arranged close to magnetic head 360 of the magnetic card reader is as follows. It is assumed that transaction terminal device 1 according to Exemplary Embodiment 1 is used in a "longitudinal direction" for the transaction, but may be used in a "transversal direction" in the purpose of use other than the transaction. The "longitudinal direction" is, for example, a direction in which housing 19 is erected such that first touch-panel-equipped LCD 31 and second touch panel 45 are parallel to the vertical line, or a direction close to the aforementioned direction. The "transversal direction" is, for example, a direction in which housing 19 is erected such that first touch-panel-equipped LCD 31 and second touch panel 45 are perpendicular to the vertical line, or a direction close to the aforementioned direction. In order to secure high communication quality in transaction terminal device 1 according to Exemplary Embodiment 1, it is necessary to use the space diversity effect described above even in any direction. Even in any direction, when the operator holds and operates transaction terminal device 1, at least one antenna element of the diversity antenna is preferably positioned as far as possible.

In addition, speaker 26b and DC jack 50a for supplying power to power supply 50 from the outside are arranged at side end 19b of secure module 3 of transaction terminal device 1 according to Exemplary Embodiment 1. Secure module 3 and the lower end of main substrate 2a (main electronic circuit board 2a) arranged in non-secure region 2 are connected to each other at side end 19b through first IF 40 and second IF 41 (see FIG. 2). Accordingly, local area wireless communication antenna 23b and wide-area wireless communication antenna 25b are arranged on the same end (side end 19c) separated from the operator in the "transversal direction" and within housing 19 held by the operator such that side end 19b is positioned on a lower side in a direction parallel to the vertical line.

Local area wireless communication antenna 23a and wide-area wireless communication antenna 25a are arranged on the same end (upper end 19a) separated from the operator within housing 19 in "longitudinal direction". In other words, local area wireless communication antenna 23a and wide-area wireless communication antenna 25a are arranged on a side opposite to secure module 3 including second touch panel 45 with first touch-panel-equipped LCD 31 and central part 19*d* of housing 19 interposed therebetween.

In order to secure reading operability of the credit card, magnetic head 360 is arranged on a side separated from the operator in the "longitudinal direction", that is, on a side opposite to secure module 3 including second touch panel 45 with first touch-panel-equipped LCD 31 and central part 19*d* of housing 19 interposed therebetween.

From the above, any of magnetic head 360, magnetic head module 36 that supports the magnetic head, local area wireless communication antenna 23*a* and wide-area wireless communication antenna 25*a* is arranged at the same end (upper end 19*a*) in housing 19.

In order to secure reading stability of magnetic card 370, magnetic head 360 is arranged close to the center of upper end 19*a* in the width direction in which housing 19 is erected such that first touch-panel-equipped LCD 31 and second touch panel 45 are parallel to the vertical line. In addition, it is assumed that transaction terminal device 1 according to Exemplary Embodiment 1 is held by one hand of the operator and is operated by the other hand when housing 19 is erected such that first touch-panel-equipped LCD 31 and second touch panel 45 are parallel to the vertical line. Thus, transaction terminal device 1 has limitations on expansion in the width direction when housing 19 is erected such that first touch-panel-equipped LCD 31 and second touch panel 45 are parallel to the vertical line. Outer camera 37 for reading the barcode may be mounted on upper end 19*a* of transaction terminal device 1. It is very difficult to secure the distance between wide-area wireless communication antenna 25*a* having a large area and magnetic head 360.

As described above, at least one antenna is close to magnetic head 360 of the magnetic card reader. This reason is because it is necessary to set the distance between two communication antennas constituting the diversity to at least about ¼ wavelengths or more in order to increase a space diversity effect of communication. When the transaction terminal device is designed for miniaturization such that the user carries transaction terminal device 1 and performs the transaction inside or outside the building or inside or outside the site, an appropriate dimension of urging member 364*a* approximates a dimension in which a radio wave used for wide-area wireless communication resonates. As a result, as described above, due to a reradiated radio wave generated by urging member 364*a* receiving a radio wave radiated from wide-area wireless communication antenna 25*a*, communication characteristics of wide-area wireless communication antenna 25*a* close to urging member 364*a* are degraded. Similarly, reception characteristics of wide-area wireless communication antenna 25*a* are also degraded. That is, communication quality of wide-area wireless communication antenna 25*a* is not secured, and thus, transaction terminal device 1 does not normally complete the transaction by the read magnetic card in some cases.

In order to solve such problems, as shown in FIGS. 4 and 5, in magnetic head module 36 mounted on transaction terminal device 1 according to Exemplary Embodiment 1, the urging member that exerts the urging force to magnetic head 360 is wire spring 364 made from a metal wire. Since a power reradiated from wire spring 364 receiving a radio wave radiated from wide-area wireless communication antenna 25*a* is considerably smaller than that of urging member 364*a* (see FIG. 6) made from the metal plate of the related art, degradation in transmission characteristics of wide-area wireless communication antenna 25*a* due to the reradiated radio wave is reduced. Similarly, degradation in reception characteristics of wide-area wireless communication antenna 25*a* is reduced. Accordingly, even though communication antenna 25*a* is unavoidably arranged close to magnetic head 360 due to particular circumstances of transaction terminal device 1 according to Exemplary Embodiment 1 described above, communication quality of transaction terminal device 1 is secured. The user of transaction terminal device 1 can normally complete the transaction using the read magnetic card even in any place of inside or outside the building and inside or outside the site of the user. Particularly, when the user of transaction terminal device 1 performs the transaction using the magnetic card of the customer of the visiting site, it is possible to normally complete the transaction using the read magnetic card.

As stated above, the configuration of Exemplary Embodiment 1 facilitates the high functionality of the portable transaction terminal device 1, solves the problems about the reradiated radio wave occurring by providing a plurality of communication functions, and simultaneously secures communication quality and convenience as the transaction terminal device. Even though wide-area wireless communication antenna 25*a* is arranged close to magnetic head 360, the reradiated radio wave generated from the metal urging member of magnetic head 360 receiving a radio wave radiated from wide-area wireless communication antenna 25*a* is reduced, and thus, communication quality is secured. Magnetic head 360 and wireless communication antennas 23*a* and 25*a* are arranged on a side separated from the operator, and both of reading operability and communication quality of magnetic card 370 are secured. The user of transaction terminal device 1 can normally complete the transaction using the read magnetic card even in any place of inside and outside of the building and inside and outside of the site of the user.

The present invention is not limited to the configuration of Exemplary Embodiment 1 described above, and any configuration may be applied as long as functions described in the claims or functions included in the configuration of Exemplary Embodiment 1 can be achieve.

For example, in Exemplary Embodiment 1, it has been described that the magnetic card (magnetic credit card) for the transaction is used, but magnetic cards (point cards, ID cards, and bank cash cards) for the purpose of use other than the transaction may be used. The structure for supporting magnetic head 360 of the present invention to exert the urging force is not limited to the structure shown in FIGS. 4 and 5, and may be any structure as long as an urging member made from a metal wire is included.

What is claimed is:

1. A transaction terminal device comprising:
   a magnetic head which reads a magnetic card;
   a plurality of communication antennas for communications according to different standards, at least one of the plurality of communication antennas being arranged at a same end as the magnetic head within a housing; and
   line-shaped metal that exerts urging force to the magnetic head in a direction perpendicular to an insertion direction of the magnetic card,
   wherein the line-shaped metal is arcuate with the magnetic head being between ends of the line-shaped metal and a curved portion of the line-shaped metal between the ends exerting the urging force to the magnetic head.

2. The transaction terminal device of claim 1,
   wherein at least one of the plurality of communication antennas for the communications according to different standards is one antenna element of a diversity antenna including a plurality of antenna elements, and a second antenna element of the diversity antenna is arranged within the housing on a side opposite to the magnetic head with a central part of the housing interposed therebetween.

3. The transaction terminal device of claim 1, further comprising:
a display; and
a secure input that receives a secure input,
wherein the magnetic head and the plurality of communication antennas for the communications according to different standards are arranged within the housing on a side opposite to the secure input with a central part of the housing and the display interposed therebetween.

4. The transaction terminal device of claim 1,
wherein, among the plurality of communication antennas for the communications according to different standards, a first communication antenna for communication that uses a first communication frequency bandwidth lower than a second communication frequency bandwidth of a second communication antenna is one antenna element of a diversity antenna including a plurality of antenna elements, and
the second communication antenna is a second antenna element of the diversity antenna and is arranged within the housing on a side opposite to the magnetic head with a central part of the housing interposed therebetween.

5. The transaction terminal device of claim 1, further comprising:
a display; and
a secure input that receives a secure input,
wherein the magnetic head and one antenna element of a space diversity antenna are arranged within the housing on a side opposite to the secure input with a central part of the housing and the display interposed therebetween.

6. The transaction terminal device of claim 5,
wherein, within the housing, a second antenna element of the space diversity antenna is arranged on a second side opposite to the magnetic head with the display and the central part of the housing interposed therebetween and is within the housing closer to the central part than a secure input.

7. The transaction terminal device of claim 1, wherein
the housing comprises a first case and a second case, with a slit being formed between the first case and the second case, and
when the magnetic card is inserted into the slit, the line-shaped metal exerts the urging force to the magnetic head.

8. The transaction terminal device of claim 7, wherein
the magnetic head is attached to the first case, and
the line-shaped metal presses the magnetic head to the second case.

9. The transaction terminal device of claim 1, wherein
the housing comprises an upper area in which one of the plurality of communication antennas is arranged and a lower area in which another of the plurality of communication antennas is arranged.

10. The transaction terminal device of claim 9, wherein
the upper area corresponds to a first half of the housing,
the lower area corresponds to a second half of the housing, and
a number of the plurality of communication antennas arranged in the upper area is greater than a number of the plurality of communication antennas arranged in the lower area.

11. The transaction terminal device of claim 9, further comprising:
a main circuit board arranged in both the upper area and the lower area; and
a secure module, having tamper resistance, arranged in the lower area, wherein
the main circuit board is arranged between the secure module and one of the plurality of communication antennas arranged in the upper area.

12. The transaction terminal device of claim 9, wherein
the plurality of communication antennas comprises a high band antenna having a first high band antenna arranged in the upper area and a second high band antenna arranged in the lower area, the first high band antenna and the second high band antenna configuring a first diversity antenna.

13. The transaction terminal device of claim 12, wherein
the plurality of communication antennas further comprises a low band antenna performing wireless communication using lower frequency bands than the high band antenna, the low band antenna having a first low band antenna and a second low band antenna configuring a second diversity antenna.

14. The transaction terminal device of claim 13, wherein
the upper area has a first upper area in which the first low band antenna is arranged and a second upper area in which the second low band antenna is arranged, the second upper area being located between the first upper area and the lower area.

15. The transaction terminal device of claim 14, wherein
the magnetic head is arranged between the first high band antenna and the first low band antenna in the first upper area.

16. The transaction terminal device of claim 14, further comprising:
a camera that at least one of takes an image and reads a barcode, the camera being arranged between the first high band antenna and the first low band antenna in the first upper area.

17. The transaction terminal device of claim 1, wherein
the plurality of communication antennas comprises a high band antenna and a low band antenna, the low band antenna performing wireless communication using lower frequency bands than the high band antenna,
the high band antenna includes a first high band antenna and a second high band antenna, the first high band antenna and the second high band antenna configuring a first diversity antenna,
the low band antenna includes a first low band antenna and a second low band antenna, the first low band antenna and the second low band antenna configuring a second diversity antenna, and
a distance between the first high band antenna and the second high band antenna is greater than a distance between the first low band antenna and the second low band antenna.

18. The transaction terminal device of claim 1, wherein
at least two of the plurality of communication antennas are arranged at the same end as the magnetic head within the housing, the magnetic head being between the at least two of the plurality of communication antennas,
the at least two of the plurality of communication antennas include a local area wireless communication antenna and a wide-area wireless communication antenna, the wide-area wireless communication antenna is closer to the magnetic head than the local area wireless communication antenna, and a dimension of the line-shaped metal corresponds to a dimension in which a radio wave used for wide-area wireless communication by the wide-area wireless communication antenna resonates.

19. A transaction terminal device, comprising:

a housing including a slit;

a magnetic head which reads a magnetic card inserted into the slit and includes line-shaped metal which exerts urging force to the magnetic head in a direction perpendicular to an insertion direction of the magnetic card;

a plurality of communication antennas which are for wireless communications according to different standards and include a diversity antenna configured by a first antenna and a second antenna;

an input which receives at least money amount information and personal identification information; and a display which displays at least the money amount information received by the input, wherein the display is arranged between the magnetic head and the input when viewing the transaction terminal device in a direction perpendicular to the display, and the line-shaped metal is arcuate with the magnetic head being between ends of the line-shaped metal and a curved portion of the line-shaped metal between the ends exerting the urging force to the magnetic head.

20. A transaction terminal device, comprising:

a housing including a slit;

a magnetic head which reads a magnetic card inserted into the slit and includes line-shaped metal having a straight portion which exerts urging force to the magnetic head;

a plurality of communication antennas which are for wireless communications according to different standards and include a diversity antenna configured by a first antenna and a second antenna;

an input which receives at least money amount information and personal identification information; and a display which displays at least the money amount information received by the input; wherein the display is arranged between the slit and the input when viewing the transaction terminal device in a direction perpendicular to the display, and the line-shaped metal is arcuate with the magnetic head being between ends of the line-shaped metal and a curved portion of the line-shaped metal between the ends exerting the urging force to the magnetic head.

* * * * *